United States Patent [19]

Hurd

[11] 4,336,698

[45] Jun. 29, 1982

[54] LUG NUT LOCK

[76] Inventor: Gary L. Hurd, 5870 Salacot Ct., San Diego, Calif. 92124

[21] Appl. No.: 55,691

[22] Filed: Jul. 6, 1979

[51] Int. Cl.[3] .................. F16B 41/00; E05B 27/08; E05B 13/10
[52] U.S. Cl. .................. 70/231; 70/165; 70/223; 70/363
[58] Field of Search .......... 70/231, 223, 189, 363, 70/165; 192/67 R, 94

[56] References Cited

U.S. PATENT DOCUMENTS

| | | | |
|---|---|---|---|
| 1,005,496 | 10/1911 | Armbruster | 70/223 |
| 1,387,442 | 8/1921 | Lee | 70/363 |
| 1,447,754 | 3/1923 | Brabant | 70/223 |
| 1,767,438 | 6/1930 | Dranter et al. | 70/363 X |
| 1,767,643 | 6/1930 | Baird | 70/231 |
| 1,803,609 | 5/1931 | Graf | 70/223 |
| 1,861,140 | 5/1932 | Samburg | 70/231 |
| 1,937,848 | 12/1933 | Shinn | 70/231 |
| 2,225,132 | 12/1940 | Seaman | 70/231 X |
| 2,729,090 | 10/1956 | Floraday | 70/223 |
| 2,778,215 | 1/1957 | Redmond | 70/231 |
| 2,919,739 | 1/1960 | Vocke | 70/231 X |
| 3,426,932 | 2/1969 | Rouse | 70/165 X |
| 3,540,245 | 11/1970 | Pope | 70/231 |
| 4,191,036 | 3/1980 | Steinbach | 70/363 |

FOREIGN PATENT DOCUMENTS 180510  6/1922  United Kingdom ............... 70/363

*Primary Examiner*—Roy D. Frazier
*Assistant Examiner*—Carl F. Pietruszka
*Attorney, Agent, or Firm*—Brown & Martin

[57] ABSTRACT

A tamper proof lug nut or bolt lock assembly includes a substantially cylindrical portion on which is rotatably mounted a sleeve having a hex portion for receiving a wrench and a selective coupling assembly disposed within the sleeve for selectively coupling and uncoupling the sleeve to the nut or bolt assembly by means of a key of a predetermined configuration.

9 Claims, 5 Drawing Figures

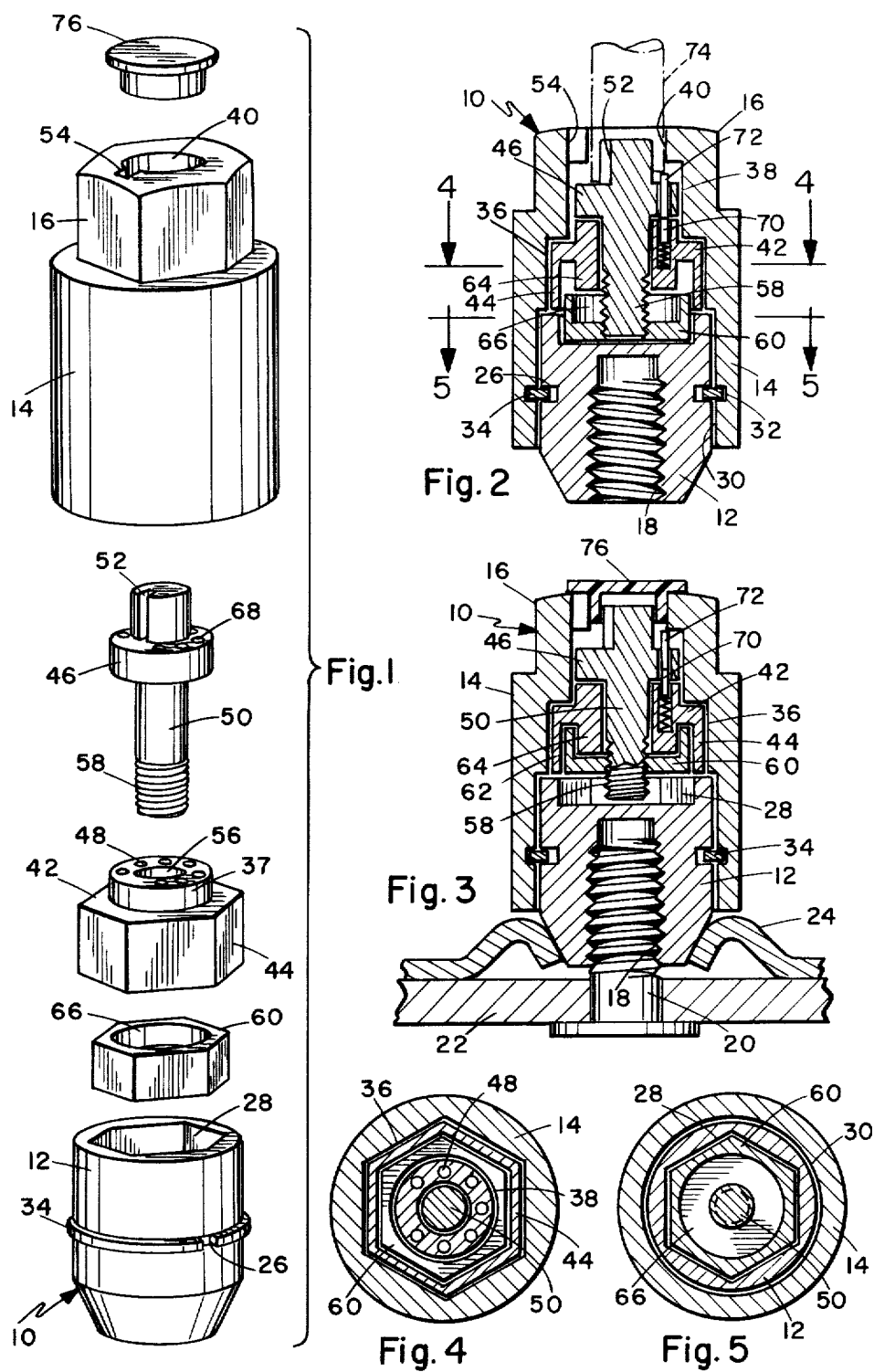

LUG NUT LOCK

BACKGROUND OF THE INVENTION

The present invention relates to security devices, and pertains particularly to nut or bolt having means to selectively prevent removal once secured into position.

The theft of automobile wheels and tires has been a problem ever since the first automobiles come into production. Various nut and bolt assemblies have been devised since that time in an effort to prevent or frustrate the theft of such wheels and the like.

These devices are typically of two different types. One type is constructed to have a removable cap such that when the cap is placed on the nut or bolt, the cap rotates and prevents the removal of the nut or bolt. The other approach is to provide a rotatable cap or sleeve on the nut or bolt that includes a locking means for locking the nut or cap or sleeve directly to the nut or bolt so that rotation of the cap rotates the nut or bolt for removal thereof. Exemplary of the prior art are the following U.S. Pat. Nos. 1,937,848 issued Dec. 5, 1933 to Shinn, 2,225,132 issued Dec. 17, 1940 to Seaman and 3,540,245 issued Nov. 17, 1970 to Pope.

Such prior art devices have been effective against the use of a wrench alone, however many of such devices can be rendered ineffective such as by the use of a hammer or the like which can be used to jam or break the locking mechanism. Other prior art devices are ineffective because the lock can be easily picked. Still other prior art devices are ineffective because the rotating sleeve can be jammed into the engagement with the lug nut or coupling to the lug nut. It is therefore desirable that locking devices be available which are economical and effective against theft, vandalism and the like.

SUMMARY AND OBJECTS OF THE INVENTION

It is accordingly the primary object of the present invention to overcome the above problems of the prior art.

Another object of the present invention is to provide a effective nut locking mechanism that is simple, inexpensive, and is effective.

A further object of the invention is to provide a locking retaining nut having a locking assembly that is effective against heavy blows from a hammer or the like.

In accordance with the primary aspect of the present invention, a lug nut or the like, is provided with a rotatable sleeve, having a plurality of flats for receiving a wrench and rotatably mounted on the nut with lockable connecting means for selectively connecting the sleeve to the nut and locking the sleeve in an unconnected position.

BRIEF DESCRIPTION OF THE DRAWINGS

The above and other objects and advantages of the present invention will become apparent from the following description when read in conjunction with the drawings, wherein:

FIG. 1 is an exploded perspective view of a preferred embodiment of the invention.

FIG. 2 is an axial sectional view of the assembled unit in the coupled or driving position.

FIG. 3 is a similar sectional view showing the mechanism in the uncoupled or free rotating position.

FIG. 4 is a sectional view taken on line 4—4 of FIG. 2.

FIG. 5 is a sectional view taken on line 5—5 of FIG. 2.

DETAILED DESCRIPTION OF A PREFERRED EMBODIMENT

Turning now to the drawings, a locking nut assembly in accordance with the invention is designated generally by the numeral 10, and includes as best seen in FIG. 1, a retainer nut or retaining member 12 having an outer generally cylindrical configuration for receiving a wrench. For illustrative purposes, the present invention is illustrated as a lug nut for an automobile wheel, although it may be utilized for numerous other applications, and may be for example, a lug bolt instead with the cylindrical member 12 being the equivalent of the bolt or head portion of the bolt.

As best seen in FIG. 3, the nut 12 is shown in position as a lug nut having a central threaded cylindrical bore 18 engaging the threaded ends of a lug bolt 20, which is mounted on a spindle or hub 22 for retaining a wheel 24 in position thereon. The nut 12 has a generally cylindrical outer configuration with a retaining groove 26 intermediate the ends thereof, and a generally hexagonal shaped bore 28 at the upper or outer end thereof coaxial with the threaded bore 18. This hex shaped bore or socket 28 constitutes a coupling bore which cooperates with a coupling member as will be described for coupling the outer sleeve or cap 14 to the nut 12 for rotation therewith.

The specific construction of the outer sleeve is best illustrated in FIGS. 2 and 3, wherein the sleeve 14 includes a plurality of co-axial stepped bores. Beginning at the lower most portion, a cylindrical bore 30 is a size and configuration and adapted to receive the cylindrical nut 12 for rotational mounting thereof. A peripheral groove 32 is adapted to cooperate with groove 26 for receiving a retaining ring 34 for retaining the sleeve 14 on the nut 12. Disposed next above, the first cylindrical bore is a hex shaped bore 36, within which is received the coupling housing and assembly. Next, along the axis of the housing or sleeve 14 is a cylindrical bore 38 adapted to receive the lock assembly of the device. A further substantially cylindrical bore 40 forms a key hole for receiving the key for operation of the locking assembly. This bore 40 may take any suitable configuration for adaption of a lock and receipt of a key. The illustrated configuration however, is preferred for reasons to be described.

The locking and coupling assembly comprises a housing member 42 having a hex shaped outer portion 44 for fitting within the hex shaped bore 36 of the sleeve 14 for coupling the housing thereto for rotation therewith. It is to be understood that other coupling shapes or forms such as splines or keyways, etc., can be used but the hex shape is preferred for ease of manufacture and strength. The housing member 42 may also be press fitted within bore 36 if desired. A cylindrical upper portion 37 extends upward into the cylindrical bore 38 and abutts against the lower end of a cylindrical lock collar or flange 46 disposed within the upper end of the bore 38. The lock collar 46 contains locking pins or tumblers which cooperate with locking pins and tumblers in the plurality of annular bores 48 within the housing 42. The collar 46 is integral with a rotatable threaded key shaft 50 which includes a key slot 52 cooperative with a key slot 54 in the sleeve 14. The key shaft 52 is rotatably mounted within a cylindrical bore 56 within the coupling housing 42. The lower end of the key shaft 50 includes threads 58 which threadably engage threads within a coupling member 60. Rotation of shaft 50 moves the coupling member 60 axially along the shaft by a camming action of the threads. The coupling member 60 has a generally hex shaped outer configuration to fit within a hex shaped bore 62 formed within, an annular bore or coupling socket formed within the space between skirt 44 and cylindrical extension 64 of the housing 42. The inner portion of the housing 42 defines an opposing cylindrical face 64 which fits within a cylindrical bore 66 of the coupling member 60. The coupling member 60 also is adapted to fit within the hex shaped bore 28 of nut 12.

The actual lock and key device for preventing rotation of the key shaft can take many forms but the key and pin assembly as shown is preferred. This shaft lock assembly comprises a plurality of bores 48 formed in housing member 42 and a corresponding plurality of bores 68 disposed annularly around the collar 46. A plurality of pins 70 are disposed in bores 48 and spring biased upward toward the bores 68. A plurality of pins 72 are disposed in bores 68 and engages the shoulder between bores 38 and 40 as shown in FIG. 3, some of the pins 70 extend into bores 68 when the shaft 50 is locked against rotation. A cap 76 of plastic or other suitable material is designed to press fit into the key hole 40 to keep dirt and debris from the inside of assembly.

The assembly is unlocked by means of an annular key shown in phantom at 74 in FIG. 2, having shoulders that engage pins 72 and bias them to a position that none of pins 70 or 72 extend between members 42 and 46. This type lock assembly together with substantially standard threads 58 provides improved security. This security results from the requirement of at least a full turn of shaft 50 and preferably multiple (three) turns to move coupling member 60 from the uncoupled position (FIG. 3) to the coupled position (FIG. 2). The lock is keyed such that it will rotate only 45° with each picking. Thus, multiple picking of the lock and an extensive amount of time is required to remove the lock nut by picking. Without the full three revolutions, the hex coupling between member 60 and hex bore 28 will fail and nut 12 cannot be turned.

An additional security feature results from the solid metal column support formed by the structure from the nut through the key shaft and other structure. For example, on approach to disabling the prior art device is to knock the lock and key assembly out with a punch. This cannot be done with the present construction because of the solid metal column construction. With the present construction the skirts of member 42 collapse and crimp over or into tight engagement with the coupling member 60 so that it cannot be moved from the position of FIG. 3 into engaging position or in FIG. 2, even if the lock should be destroyed so that the shaft 50 can rotate. A similar result is obtained by striking the end of the sleeve member 14.

The entire structure except for the lock assembly is designed to be formed by drop forging. This reduces the cost of production and increases strength.

Operation of the device is easily understood once the construction and arrangement of the various elements and components of the device is understood. From the above description, it is seen that the assembly of parts fit together such that the sleeve 14 is rotatably mounted on the cylindrical outer surface nut 12, and is normally rotatable thereon when it is desired that the nut 12 be non-removable. When the nut 12 is either being placed on the stud 20 is removed therefrom, it is necessary to directly couple the sleeve 14 thereto in order that a wrench fitted on the flats 16 for turning it, will also turn the cylindrical nut 12 therewith.

To accomplish the coupling, a key is inserted within the key way 40 engaging the pins 72 and key shaft 50 and unlocking the sleeve 46 from the lock housing 42 to permit rotation of the shaft 50. Rotation of the shaft 50 causes the coupling member 60 to travel axially along the shaft 50 by virtue of the threaded engagement there between. The traveling of the coupling member 60 along the shaft 50 moves the coupling member from within the chamber defined by walls 62, 64 within housing 42, outward to a position extending partially into the bore 28 on the nut member 12. Thus, extension of this member between these two members forms a coupling therebetween such that rotation of the sleeve 14 also rotates the nut 12. With this arrangement the nut then can be either removed from or placed on the bolt or stud 20.

When the nut is in place and it is desired to lock the assembly against removal the shaft 50 is rotated with the key 74 until the coupling member 60 is drawn from within the housing or bore portion 28 of nut 12, completely within the chamber defined by the walls or bores 62,64. In this position the sleeve 14 freely rotates on the nut member 12. The lower portion of the sleeve 14 is such as to fully encompass the nut 12 such that no engagement thereof can be made by means of a wrench or the like. Thus, a secure arrangement is provided.

Additional security features of the device are provided by means of the construction wherein axial pin tumblers arrayed about the axis of the nut are provided such that they cannot be sheared by a heavy blow from a hammer or the like. Moreover, the coupling between the sleeve 14 and the nut 12 cannot be disturbed by virtue of the shoulders between the bores 36, 38 and the engagement therewith by the upper portion of the housing 14 which also engages the upper end of the unit 12.

While the present invention has been illustrated and described by means of a single embodiment, it is to be understood that numerous changes and modifications can be made therein without departing from the spirit and scope of the invention as defined in the appended claims.

I claim:

1. A locking device comprising in combination:
   a lug nut having a threaded bore threadably engaging a first member for securing a second member thereto, said lug nut having a generally cylindrical outer surface and being rotatable into and out of a securing position:
   a sleeve having multiple stepped cylindrical bores rotatably mounted on and covering said cylindrical surface of said lug nut and an annular shoulder engaging the end of said nut, and annular retainer ring retaining said sleeve on said nut, said sleeve having a hex outer portion for engagement for rotation by a wrench for removal of said fastening element from said first member,
   said nut including a substantially coaxial, hexagonal shaped bore formed therein, said sleeve includes a locking housing non-rotatably mounted within said sleeve, said housing having a cylindrical bore and an outer hexagonal configuration, said sleeve also including a coaxial bore formed therein of a hexagonal configuration, a threaded key shaft coaxially rotatably mounted in said housing cylindrical bore and rotatable by means of a key, and a coupling element having a hexagonal shaped outer portion coaxially threadably mounted on said key shaft and movable between a non-coupling position retracted within said bore in said sleeve and a coupling position within both said sleeve and said bore in said nut upon rotation of said key shaft a multiple number of turns, wherein the key shaft includes locking means for preventing rotation of said key shaft including a plurality of pins biased between said locking housing and an annular flange on said key shaft for preventing the rotation of said key shaft;

said key shaft and said sleeve including means defining an annular bore for receiving an annular key for cooperatively engaging at least a plurality of locking pins for permitting rotation of said key shaft within said housing wherein said locking housing defines a skirt for encompassing said coupling element and is responsive to axial force thereon for crimping onto said coupling elements.

2. The locking device of claim 1 wherein said key shaft abuts at one end of said nut and forms a column for resisting force destruction of said lock assembly.

3. A lug locking device comprising in combination:

a fastening element threadably engaging a first member for securing a second member thereto, said fastening element having a generally cylindrical outer portion, a coaxial coupling bore, and being rotatable into and out of a securing position;

a sleeve rotatably mounted on and covering said cylindrical portion of said fastening element, said sleeve having a wrench engaging outer portion for engagement and rotation by a wrench, and lockable coupling means mounted within and coaxial of said sleeve for selectively coupling said sleeve to said fastening element for rotations therewith for rotation of said fastening element relative to said first member, said coupling means comprising a locking housing non-rotatably mounted within said sleeve and including an inner cylindrical bore and an annular coupling socket, a rotatable key shaft rotatable by means of a key rotatably mounted within said inner cylindrical bore in said locking housing, and said shaft extends coaxial of said sleeve and said fastening element, said shaft having a threaded portion, and a coupling element threadably mounted on said key shaft and non-rotatably slideable within said annular coupling socket and movable upon selective rotation of said shaft to a coupling position extending between said coaxial coupling bore and said annular coupling socket for coupling said sleeve to said fastening element, and to a non-coupling position retracted with in said annular coupling socket wherein said sleeve is rotatable relative to said fastening element.

4. The locking device of claim 3 wherein said fastening element comprises a lug nut having a threaded bore and substantially cylindrical outer surface defining a substantially cylindrical configuration; said sleeve including a substantially cylindrical bore for receiving and mounting on the outer cylindrical surface of said nut and an annular retainer ring retaining said sleeve on said nut.

5. The locking assembly of claim 4 wherein said key shaft is rotatable a multiple number of turns for moving said locking element from said locking housing into locking engagement with said nut.

6. The locking assembly of claim 5 wherein said key shaft includes locking means for preventing rotation of said key shaft within said housing.

7. The locking assembly of claim 6 wherein said locking assembly includes a plurality of pins biased between said locking housing and an annular flange on said key shaft for preventing the rotation of said key shaft;

said key shaft and said sleeve including means defining an annular bore for receiving an annular key for cooperatively engaging at least a plurality of locking pins for permitting rotation of said key shaft within said housing.

8. The locking assembly of claim 7 wherein said sleeve is formed with multiple stepped bores and including an annular shoulder engaging a shoulder on the end of said fastening element.

9. The locking assembly of claim 3 wherein said locking housing defines a skirt for encompassing said coupling element and is responsive to axial force thereon for crimping onto said coupling element for restraining relative movement therebetween.

* * * * *